United States Patent
Kamikozuru

(10) Patent No.: US 6,283,068 B1
(45) Date of Patent: Sep. 4, 2001

(54) AIR-HEATED/HOT-WATER TYPE VAPORIZER AND AIR-HEATED/HOT-WATER TYPE GAS PRODUCING PLANT

(75) Inventor: Masayasu Kamikozuru, Kagoshima-ken (JP)

(73) Assignee: Koagas Nihon Co., Ltd., Kagoshima-ken (JP)

( * ) Notice: Subject to any disclaimer, the term of this patent is extended or adjusted under 35 U.S.C. 154(b) by 0 days.

(21) Appl. No.: 09/662,289

(22) Filed: Sep. 14, 2000

(30) Foreign Application Priority Data

Oct. 14, 1999 (JP) .................................... 11-292923
Mar. 13, 2000 (JP) .................................... 12-069373

(51) Int. Cl.$^7$ ................................ F28D 7/12; F22B 23/06
(52) U.S. Cl. ........................ 122/32; 122/367.3; 432/91; 165/142
(58) Field of Search ..................................... 122/1 A, 1 C, 122/31.2, 32, 190, 192, 195, 235.16, 338, 367.2, 367.3; 432/31, 91, 197, 210, 219; 165/142, 911, DIG. 183

(56) References Cited

U.S. PATENT DOCUMENTS

| | | | |
|---|---|---|---|
| 3,771,497 | * 11/1973 | Sprague et al. | ........................ 122/32 |
| 4,165,716 | * 8/1979 | Thomas et al. | ........................ 122/1 A |
| 4,429,662 | * 2/1984 | Hashizume | ............................. 122/32 |
| 4,548,257 | * 10/1985 | Williamson | ........................... 165/142 |
| 4,570,702 | * 2/1986 | Stafford et al. | ................... 122/367.3 |
| 4,694,896 | * 9/1987 | Navratil | ................................ 165/142 |
| 6,167,846 | * 1/2001 | Ogino et al. | ....................... 122/367.3 |

* cited by examiner

Primary Examiner—Gregory Wilson
(74) Attorney, Agent, or Firm—Akin, Gump, Strauss, Hauer & Feld, L.L.P.

(57) ABSTRACT

The present invention provides an air-heated/hot-water vaporizer having a very high thermal efficiency and which is easy to handle for a long period of time. Hot water supplied to the inner tube 24 of the hot water tube 22 passes through the inner tube 24 and flows out from the other end thereof to the closed end side of the outer tube 23. The hot water having flowed out to the closed end side of the outer tube 23 passes through the annular path formed by the inner tube and the outer tube 23, flows in a direction counter to that of the hot water flowing in the inner tube 24, and flows from the opening of the outer tube 23 to the outside. Liquefied gas supplied to the liquefied gas tube 21 flows along the outside of the outer tube 23, and is heated and vaporized by hot water flowing through the hot water tube 22.

20 Claims, 14 Drawing Sheets

AIR-HEATED/HOT-WATER TYPE VAPORIZER AND AIR-HEATED/HOT-WATER TYPE GAS PRODUCING PLANT

BACKGROUND OF THE INVENTION

1. Field of the Invention

The present invention relates to a vaporizer for vaporizing a liquefied petroleum gas (LPG) such as liquid propane gas or liquid butane gas, or a liquefied natural gas (LNG). More particularly, the invention relates to an air-heated/hot-water type vaporizer applicable in a cold district, in a cold climate caused by abnormal weather, or in the coldest season, and a gas producing plant using such a vaporizer. The present invention can suitably be used for the production of propane gas, butane gas or a natural gas mixed with air, respectively, from liquid propane gas, liquid butane gas or liquefied natural gas.

2. Description of the Related Art

As is disclosed in Japanese Patent Application Laid-Open No. 61-180099, the present applicant proposed a plant for the production of 13A propane-air gas by vaporizing liquid propane gas in an air-heated type forced vaporizer and mixing with air.

In the air-heated type forced vaporizer used in this 13A propane-air gas producing plant, the heat exchanger is prepared with a finned heat transfer tube (multiple-unit heat transfer coefficient: 25.3 $kg/m^3.hr.°$ C.) made of aluminum having a high heat transfer efficiency similar to that of liquid oxygen or liquid nitrogen, and the boiling point of liquid propane gas flowing into the vaporizer is reduced by reducing the pressure at the liquid inlet of the vaporizer, for example, to $-27°$ C. with 1 $kg/cm^2.G$ to achieve a temperature difference from the open air temperature, thereby conducting gasification by means of the finned heat transfer tube.

Since the air-heated type forced vaporizer uses the open air temperature as a heat source, and vaporizes liquid propane gas under the effect of a temperature difference between the open air temperature and the liquid temperature of liquid propane gas, this 13A propane-air gas producing plant does not require an initial cost for the heat source facilities for vaporization or a running cost of these facilities, thus providing a feature of permitting production and supply of town gas at a very low cost.

In the aforementioned 13A propane-air gas producing plant proposed by the present applicant, however, the standard design capacity of the air-heated type forced vaporizer is continuous operation for four hours under conditions including an open air temperature of at least $-8°$ C., cloudy weather and windless state, taking account of the initial cost of facilities. It therefore becomes difficult or even impossible to use in a coldest district or during the coldest season.

In a district located in the south of Kanto, Japan, for example, conditions can well be coped with by the air-heated type forced vaporizer of the above-mentioned design specifications, but vaporizing ability is reduced in other district or in winter. According to the result of experimental studies carried out by the present applicant. The northern limit is the northern district of Kanto.

Even in a district south of Kanto, severe frosting onto the vaporizer caused as a result of continuous operation of the plant necessitates a spare air-heated type forced vaporizer for switching, thus leading to a higher initial cost.

Installation of a separate hot-water type vaporizer to cope with a cold district or the coldest season would result in a further higher initial cost.

In Japan, it is tried to produce butane-air gas from liquid butane gas as raw material in a town gas producing plant.

Liquid butane used in the butane-air gas plant has such a high boiling point as about 15° C. at 1 $kg/cm^2.G$ and must be vaporized by means of a vaporizer using electricity, hot water or steam as a heat source, so that it has been impossible to use a conventional air-heated type forced vaporizer as that used in the aforementioned 13A propane-gas producing plant.

In view of the problems as described above, the present applicant proposed an air-heated/hot-water type vaporizer, in Japanese Patent Application Publications Nos. 6-89879 and 6-89880, air-heated/hot-water type vaporizers permitting switch operation in response to weather and other conditions: air-heated type in summer and hot-water type in winter, in general, and satisfactory vaporization of LPG even in a cold district or during the coldest season.

The air-heated/hot-water type vaporizer disclosed in Japanese Patent Application Publication No. 6-89879 has a supply-side manifold, a discharge-side manifold, and a plurality of heat transfer tubes connecting the supply-side manifold and the discharge-side manifold. The supply-side manifold has a double-pipe structure comprising a liquefied petroleum gas tube and jacket tubes arranged so as to surround the outside of this liquefied petroleum gas tube. Liquefied petroleum gas is supplied to the liquefied petroleum gas tube, and hot water is supplied to the jacket tubes.

The air-heated/hot-water type vaporizer disclosed in Japanese Patent Application Publication No. 6-89880 has a configuration similar to that of the air-heated/hot-water type vaporizer disclosed in Japanese Patent Application Publication No. 6-89879 except that a heating tube is spirally wound round the outer periphery of the supply-side manifold, and hot water is supplied into the heating tube.

An air-heated/hot-water type vaporizer of such a configuration permitted increase in the vaporizer and vaporization capacities, and efficient removal of frost depositing onto the vaporizer as a result of continuous operation and was efficiently applicable to a 13A propane/air gas producing plant or a butane/air gas producing process without need of a spare vaporizer for switching.

As disclosed in Japanese Unexamined Patent Application Laid-Open Nos. 6-94194, 9-287697 and 9-287698, the present applicant proposed an air-heated/steam type vaporizer using steam in place of hot water for the purpose of improving the aforementioned air-heated/hot-water type vaporizer.

As a result of further study and experiments carried out by the present applicant, the air-heated/steam type vaporizer was found to have a higher thermal conductivity as compared with the air-heated/hot-water type vaporizer, and permits improvement of the vaporizer and vaporization capacities, but has problems in the necessity of maintenance control and water control of the boiler and a high running cost.

As compared with the air-heated/steam type vaporizer, the airheated/hot-water type vaporizer was found to provide the following advantages:

(1) Use of hot water at a temperature of from 20° C. to 80° C. in place of steam results in low in-boiler temperature and pressure, thus leading to almost complete absence of deposited scale and a longer service life.

(2) A water softening apparatus for supply water is not necessary. This corresponds to a lower equipment cost. A boiler compound for water control is not needed, leading to a lower running cost.

(3) A simple structure results in fewer failures.

(4) It is easier to effect operational control and handling.

SUMMARY OF THE INVENTION

The present invention has therefore an object to provide an air-heated/hot-water type vaporizer which is applicable at a highest atmospheric temperature of 40° C. and at a lowest atmospheric temperature of −30° C., applicable stably for a boiler, has a very high thermal efficiency, can solve the problems involved in the air-heated/steam type vaporizer, eliminates the necessity of maintenance control or water control for boiler, permits reduction of the running cost, improvement of the vaporizer and vaporization capacities over those of the conventional air-heated/hot-water type vaporizer, gives a very high thermal efficiency, and is easy to handle for a long-term use.

Another object of the invention is to provide an air-heated/hot-water type gas producing plant for producing a gas by vaporizing liquefied petroleum gas (LPG) and liquefied natural gas (LNG), provided with an air-heated/hot-water type vaporizer which can be operated while switching over between air-heated type in summer and hot-water type in winter in general, depending upon weather conditions, and can vaporize liquefied petroleum gas (LPG) and liquefied natural gas (LPG) at a high efficiency.

The above-mentioned objects of the invention are achieved by the air-heated/hot-water type vaporizer and the air-heated/hot-water type gas producing plant of the invention.

The first invention provides an air-heated/hot-water type vaporizer comprising:

a supply-side manifold, a discharge-side manifold, and a plurality of heat transfer tubes having ends on one side connected to said supply-side manifold and ends on the other side connected to said discharge-side manifold;

said supply-side manifold having a liquefied gas tube to which the ends on one side of said heat transfer tubes are connected and which is supplied with liquefied gas, and at least one hot water tube with a double-pipe structure, which is arranged in said liquefied gas tube and which is supplied with hot water;

said hot water tube having an inner tube having an end connected to a hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside; and said liquefied gas supplied to said liquefied gas tube flowing outside said outer tube and being heated by the hot water flowing through said hot water tube and vaporized.

According to an embodiment of the first invention, a flat plate is attached to a position in the proximity to the end on the hot water supply side of said liquefied gas tube, thus delimiting a hot water supply chamber between the end of said liquefied gas tube and said flat plate;

an opening is formed in said flat plate, to which an end of said inner tube of the hot water tube is liquid-tightly attached;

a flange is attached to a position spaced apart of said flat plate toward the inside of said liquefied gas tube by a prescribed distance in said liquefied gas tube, thereby delimiting a hot water discharge chamber between said flat plate and said flange; and an opening is formed in said flange, to which the opening end of the outer tube of said hot water tube is liquid-tightly attached.

According to another embodiment of the first invention, said liquefied gas tube is formed with a first portion provided with said flat plate and a second portion to which said heat transfer tube is attached, and said first portion and said second portion are connected by putting said flange, to which said outer tube is attached, therebetween.

The second invention provides an air-heated/hot-water type gas producing plant comprising a hot water supply source, a liquefied gas supply source, a liquefied gas vaporizing section for vaporizing liquefied gas supplied from said liquefied gas supply source by the hot water supplied from said hot water supply source, a heating section for heating the gas vaporized at said liquefied gas vaporizing section to a predetermined temperature; wherein said liquefied gas vaporizing section comprises an air-heated/hot-water type vaporizer, and said air-heated/hot-water type vaporizer has:

a supply-side manifold, a discharge-side manifold, and a plurality of heat transfer tubes having ends on one side connected to said supply-side manifold and ends on the other side connected to said discharge-side manifold;

said supply-side manifold having a liquefied gas tube to which the ends on one side of said heat transfer tubes are connected and which is supplied with liquefied gas, and at least one hot water tube with a double-pipe structure, which is arranged in said liquefied gas tube and which is supplied with hot water;

said hot water tube having an inner tube having an end connected to said hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside;

said liquefied gas supplied to said liquefied gas tube flowing outside said outer tube and being heated by the hot water flowing through said hot water tube and vaporized; and said vaporized gas beings supplied to said heating section and heated.

According to an embodiment of the second invention, said heating section has an air-heated vaporizer, and said air-heated vaporizer heats the vaporized gas.

According to another embodiment of the second invention, said air-heated vaporizer has a supply-side manifold which is arranged at an upper position of the vaporizer to receive the vaporized gas from the vaporizing section, a discharge-side manifold which is arranged at an lower position of the vaporizer to receive the vaporized gas and to supply the gas to a vapor mixer, and a plurality of heat transfer tubes connected to said supply-side manifold and said discharge-side manifold.

According to another embodiment of the second invention, said air-heated/hot-water vaporizer has a heating means.

According to another embodiment of the second invention, said heating means has at least one hot water tube positioned in said discharge-side manifold. The hot water tube has a plurality of fins which project in a radial direction on the circumference of the tube and extend in an axial direction of the tube, or has at least one hot water tube with a double-pipe structure. The hot water tube has an inner tube having an end connected to said hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside; and said vaporized gas supplied to said discharge-side manifold flowing outside said outer tube and being heated by the hot water flowing through said hot water tube.

According to an embodiment of the first and second invention, said liquefied gas is liquefied propane gas, liquefied butane gas, or liquefied natural gas.

According to another embodiment of the first and second invention, said hot water has a temperature within a range of from about 20° C. to about 80° C. Preferably, said hot water is water, water-antifreezing solution mixture in which water is mixed with an antifreezing solution, or other heat transfer mediums. The heat transfer mediums may include an alternate fluorocarbon.

DESCRIPTION OF THE PREFERRED EMBODIMENTS

The air-heated/hot-water type vaporizer and the air-heated/hot-water type gas producing plant of the prevent invention will now be described further detail with reference to the drawings.

Embodiment 1

Figure 1:
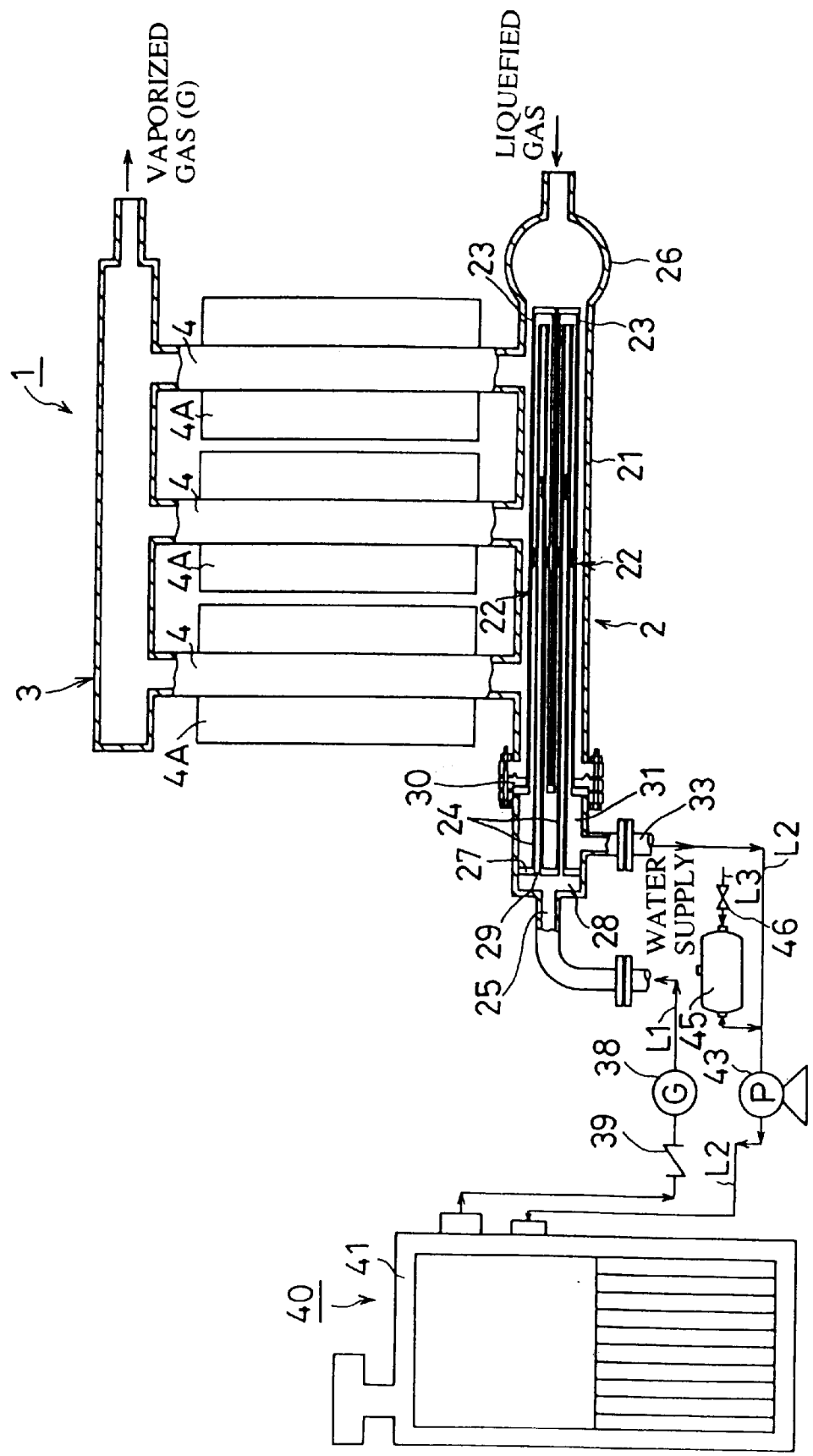
FIG. 1 illustrates a schematic configuration of the air-heated/hot-water type vaporizer and the gas producing plant of the present invention.

FIG. 1 illustrates a schematic configuration of an embodiment of the air-heated/hot-water type vaporizer of the invention. According to this embodiment, the air-heated/hot-water type vaporizer 1 has a supply-side manifold 2 and a discharge-side manifold 3, and a plurality of heat transfer tubes 4 are connected between the supply-side manifold 2 and the discharge-side manifold 3. Further, to improve the heat transfer (endothermic) effect of the heat transfer tubes 4, heat transfer fins 4A are arranged around the heat transfer tubes 4.

Further according to the invention, as is well understood with reference to FIG. 2, the supply-side manifold 2 has a tube communicating with the individual heat transfer tube 4, to which liquefied petroleum gas or liquefied natural gas is supplied (hereinafter simply referred to as the "liquefied gas tube") 21 and a hot water tube 22, having a reflux type double-pipe structure, arranged in the inside of the liquefied gas tube 21. As required, a single hot water tube 22 or a plurality of hot water tubes 22 may be arranged in the liquefied gas tube 21. In this embodiment, four hot water tubes 22 are arranged as shown in FIG. 3.

The hot water tube 22 has an outer tube 23 having a closed end and the other opening end, and an inner tube 24 having both ends opening inserted in the outer tube. An end of the liquefied gas tube 21, i.e., the left end in FIGS. 1 and 2, is connected to a hot water supply tube 25. The other end of the liquefied gas tube 21, i.e., the right end in FIGS. 1 and 2, is connected to a liquefied gas manifold 26.

In the liquefied gas tube 21, a flat plate 27 is attached to a position adjacent to the end on the side to which the hot water supply tube 25 is connected, to form a hot water supply chamber 28 between an end of the liquefied gas tube 21 and the flat plate 27. An opening 29 is provided in the flat plate 27, and an end of the inner tube 24 of the hot water tube 22 is liquid-tightly attached thereto.

In the liquefied gas tube, a flange 30 is attached to a position spaced apart by a prescribed distance from the flat plate 27 inward of the liquefied gas tube 21, and forms a hot water discharge chamber 31 between the same and the flat plate 27. An opening 32 is formed in this flange 30, and the opening end of the outer tube 23 of the hot water tube 22 is liquid-tightly attached thereto.

Figure 2:
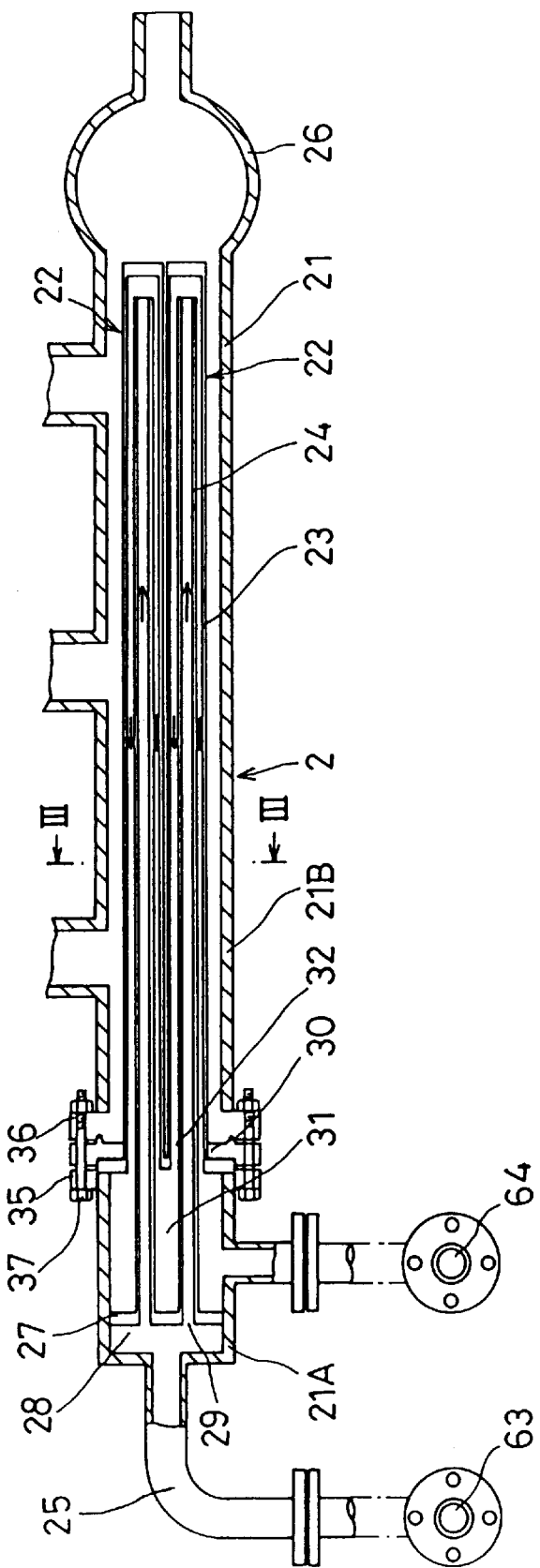
FIG. 2 is a sectional view of the supply-side manifold in the air-heated/hot-water type vaporizer of the invention.
Figure 3:
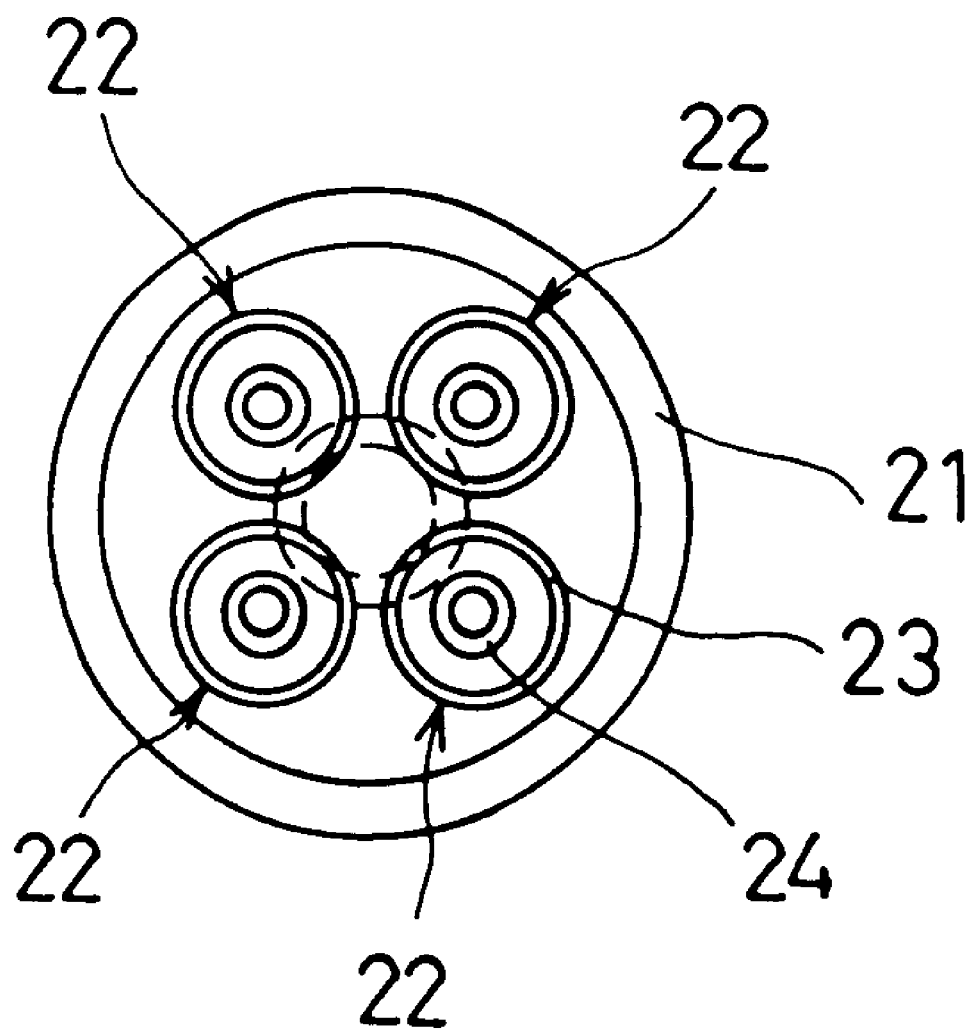
FIG. 3 is a sectional view of the liquefied gas tube at along the line III—III in FIG. 2.
Figure 4:
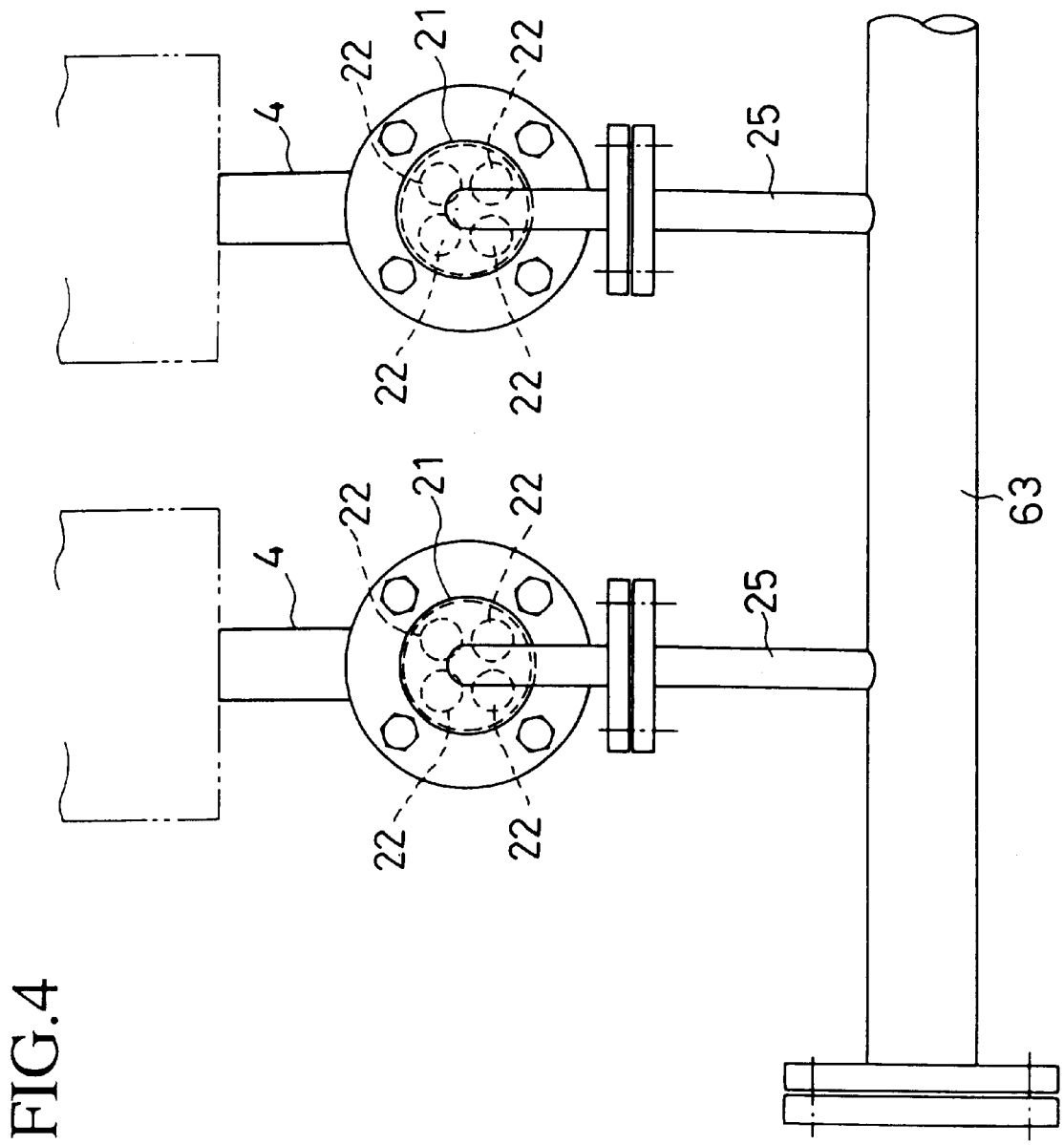
FIG. 4 is a side view of the supply-side manifold of the air-heated/hot-water type vaporizer of the invention as viewed from the right in FIG. 2.
Figure 5:
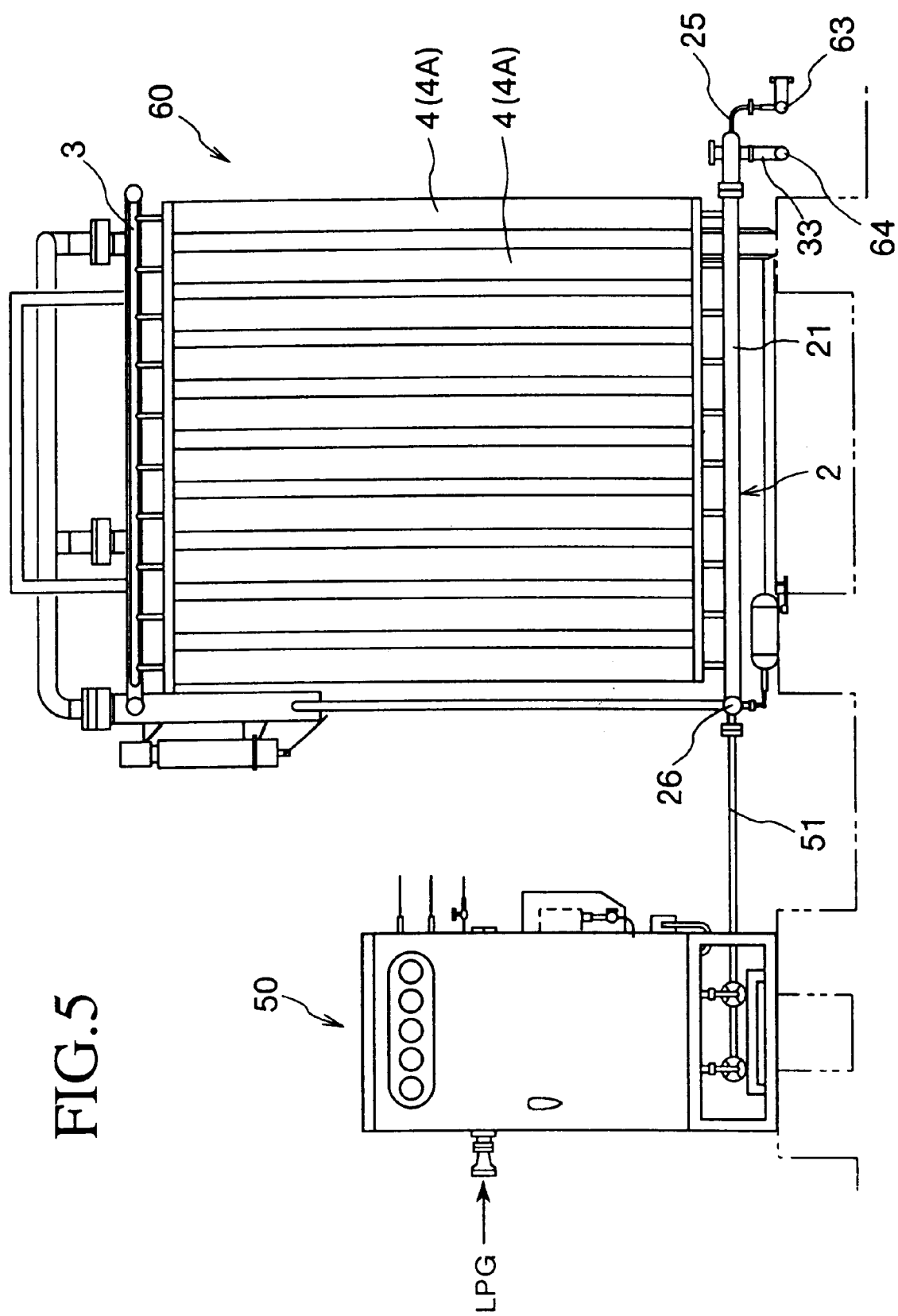
FIG. 5 is a front view of the air-heated/hot-water type gas producing plant of the invention.
Figure 6:
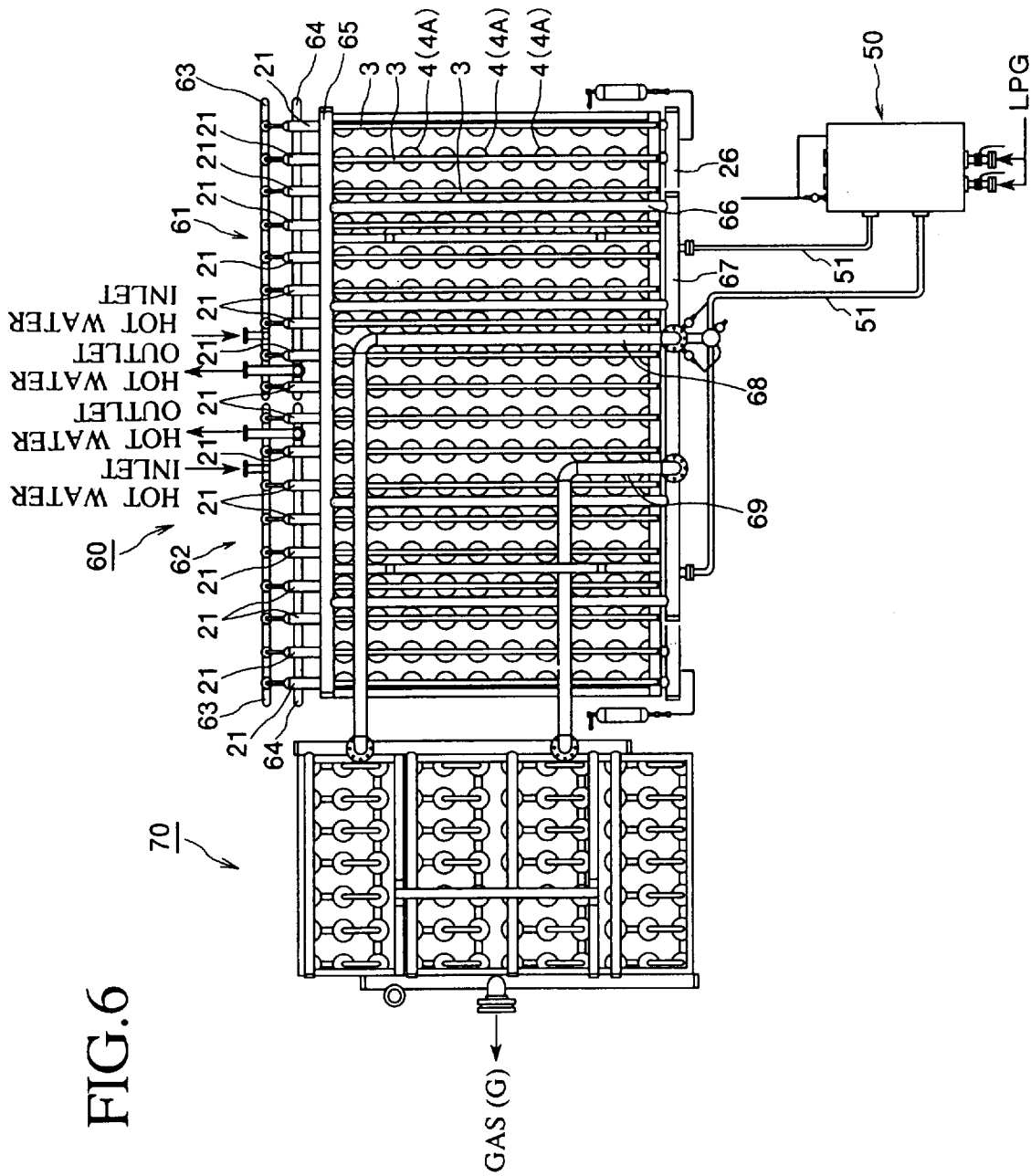
FIG. 6 is a plan view of the air-heated/hot-water type gas producing plant of the invention.
Figure 7:
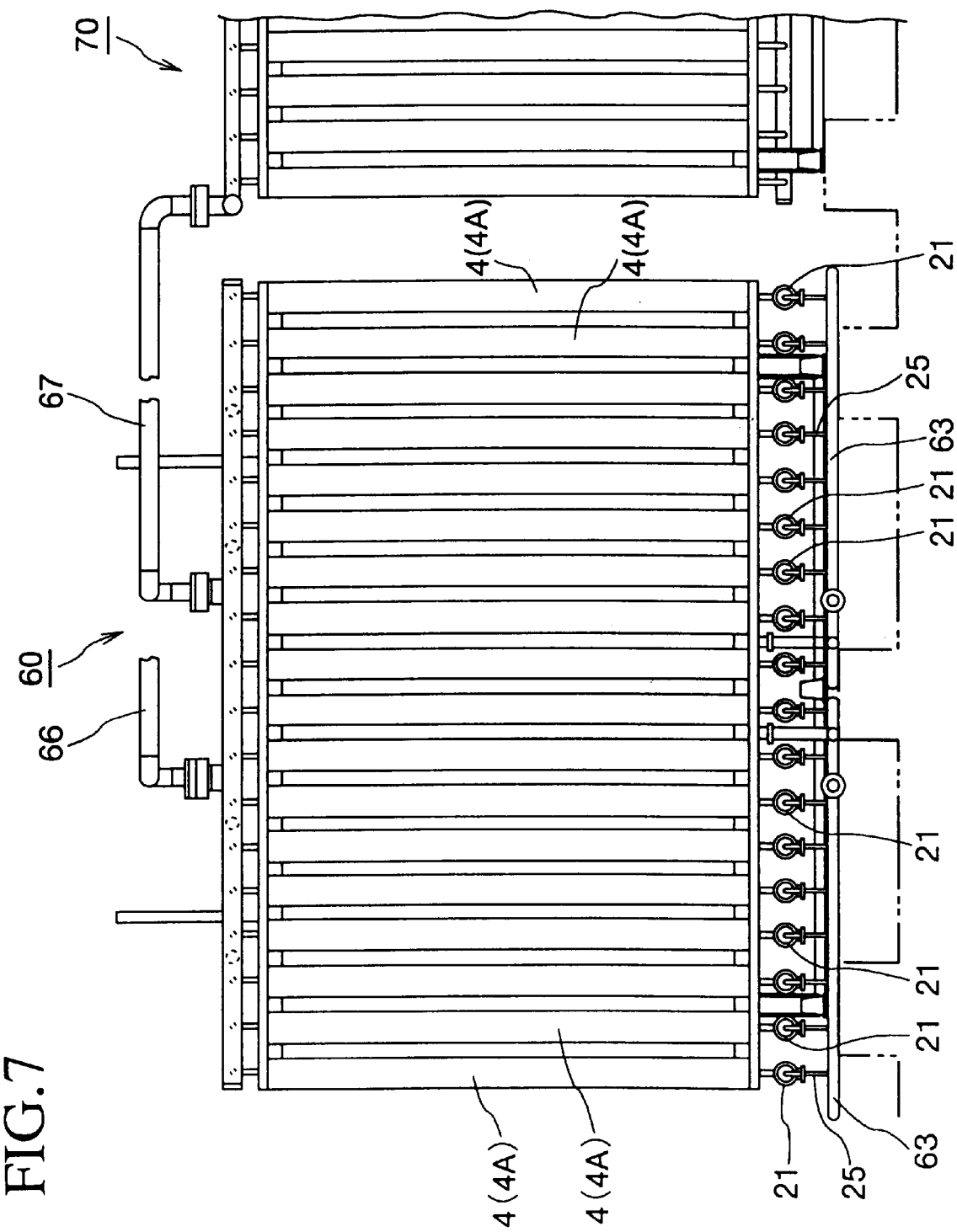
FIG. 7 is a back view of the air-heated/hot-water type gas producing plant of the invention.

According to this embodiment, as shown in FIG. 2, the liquefied gas tube 21 comprises a first portion 21A provided with the flat plate 27 and a second portion 21B to which the heat transfer tube 4 is attached. Collars 35 and 36 are integrally secured to the connecting portions of the first portion 21A and the second portion 21B, respectively. Integration is accomplished by connecting the collars 35 and 36 with bolts and nuts 37. At this point, the flange 30 having the outer tube attached thereto is held between the collars 35 and 36, and the outer tube 23 is attached to the liquefied gas tube 21. This configuration of the liquefied gas tube 21 facilitates assembly and dismantling, and makes it easier to carry out maintenance control of the air-heated/hot-water type vaporizer 1.

In the aforementioned configuration, the hot water supply tube 25 is connected to a boiler 41 forming a hot water supply source 40 through a duct L1 provided with a flow meter 38 and a valve 39. Consequently, hot water supplied from the hot water supply tube 25 to the hot water supply chamber 28 of the liquefied gas tube 21 flows into the inner tube 24 of the hot water tube 22, passes through the inner tube 24, and flows out from the other end of the inner tube 24 to the outer tube 23.

The end of the outer tube 23 on the side on which hot water flows out is closed as described above. As a result, hot water having flowed to the outer tube 23 passes through an annular space between the outer tube 23 and the inner tube 24 flows (reflux) in a direction counter to that of hot water flowing through the inner tube 24, and reaches the hot water discharge chamber 31. The hot water discharge tube 33 is connected to the hot water discharge chamber 31, and hot water is returned to the boiler 41 through a duct L2 provided with a circulating pump 43.

The hot water tube 22 formed according to the invention, having a reflux type double-pipe structure, gives a very high thermal efficiency. According to the result of study and experiments carried out by the present inventors, as compared with the conventional air-heated/hot-water type vaporizer, it has been found that the thermal efficiency is about two to three times as high.

The hot water returned from the hot water discharge chamber 31 of the liquefied gas tube 21 to the boiler 41 through the return duct L2 is subjected to temperature detection by means, for example, of temperature detecting means (not shown) such as a thermistor arranged at an appropriate position in the duct 1. Combustion in the boiler 41 is controlled by the difference from a predetermined temperature so that hot water having a prescribed temperature within a range, for example, of from 20° C. to 80° C. is constantly supplied to the hot water supply chamber 28 of the liquefied gas tube 21 through the duct L1 and the hot water supply tube 25.

The amount of circulating of the hot water through the circulating pump 43 is automatically controlled by signals from the flow meter 38 and the like. The boiler 41, of which the burner capacity is controlled by means of the temperature and quantity of circulating of the hot water, is adjusted so as to increase the boiler efficiency.

An expansion tank 45 is provided in the hot water supply source 40 with a view to constantly keeping a certain pressure of the boiler 41. The quantity of the water supplied to the expansion tank 45 is adjusted via a valve 46 of the water supply line L3 in response to a signal. Hot water in the expansion tank 45 is returned to the boiler 41 through the duct L2 provided with the circulating pump 43, and used as a preheating source of the raw water of the boiler 41.

The quantity of hot water supplied to the hot water supply chamber 28, i.e., to the hot water tubes 22 may be selected with any of the various valves in response to a desired vaporizer capacity of the air-heated/hot-water type vaporizer 1.

The liquid used as the hot water in the invention may be usual water, but should preferably be a water mixed with an antifreezing solution for the following reason.

When using, for example, liquefied propane gas as raw material liquefied gas, liquefied propane gas of a low temperature near −30° C. would flow through the liquefied gas tube 21 of the air-heated/hot-water type vaporizer 1. Therefore, even when hot water having a temperature of from 20° C. to 80° C. flows into the hot water tube 22 at a flow rate within a range of from 0.2 to 0.4 L (liter)/minute, the inside close to the liquefied gas tube 21 is cooled by the liquefied gas having a temperature near −30° C. and may be frozen. To avoid freezing, therefore, it is very desirable or even essential to mix an antifreezing solution.

As an antifreezing solution, a commercially available antifreezing solution containing 30 to 60% ethylene glycol as a main constituent may be used. The quantity of the antifreezing solution, varying with conditions of use of the vaporizer or location, would usually be: water: antifreezing solution=4:6.

Naturally, other heat transfer mediums than the above-mentioned water or water-antifreezing solution mixture may be used as the hot water flowing in the hot water tube 22 of the liquefied gas tube 21. For example, the air-heated/hot-water type vaporizer 1 of the invention may be applied to a liquefied gas producing plant using liquefied natural gas (LNG) as raw liquefied gas. In this case, as the boiling point of the liquefied natural gas is as low as −162° C., a heat transfer medium, for example, alternate fron (fluorocarbon) such as R22 or R134a, except the above mentioned water-antifreezing solution mixture, may be used. Such a use of fron has an effect on measures against white smoke at a liquefied gas vaporizing unit with the air-heated/hot-water type vaporizer 1, which is one of the problems in the liquefied gas producing plant using liquefied natural gas (LNG).

In the case where other heat transfer mediums than water or water-antifreezing solution mixture as hot water, a hot water supply system similar to that as shown in FIG. 1 may be used. In the case where such a heat transfer medium as the alternate fron is used as the hot water, the design of the system is changed according to the properties of the heat transfer mediums such that a pump for the alternate fron is used as the pump 43 and also that an alternate fron supplying apparatus is used in place of the tank 45.

As can be understood for the above, it should be noted that the term "hot water" used in the invention not only means water or water mixed with an antifreezing solution but also is used to contain other various heat transfer mediums.

Embodiment 2

The liquefied gas producing plant using the air-heated/hot-water type vaporizer 1 of the invention having the above-mentioned configuration will now be described with reference to FIGS. 1 and 4 to 7.

This embodiment covers a 13A propane-air gas producing plant for producing 13A propane-air gas by using liquefied propane gas as raw material liquefied gas and mixing the vaporized propane gas with air, with the use of the air-heated/hot-water type vaporizer 1 of the invention. In this embodiment the water mixed with an antifreezing solution is used as the hot water but is not limited to this. Various heat transfer mediums may be used as the hot water as mentioned above.

The 13A propane-air gas producing plant has a liquefied gas vaporizing unit 60 which vaporizes the liquefied gas supplied from a liquefied gas supply source 50 by means of the hot water from a hot water boiler 41 of a hot water supply source 40, and a heating section 70 which heats the gas vaporized at the liquefied gas vaporizing unit 60.

In this embodiment, the liquefied gas vaporizing unit 60 comprises a first liquefied gas vaporizing section 61 and a second liquefied gas vaporizing section 62. The first liquefied gas vaporizing section 61 and the second liquefied gas vaporizing section 62 form part of the configuration of the air-heated/hot-water type vaporizer 1 of the invention. Because the first liquefied gas vaporizing section 61 and the second liquefied gas vaporizing section 62 have the same configurations, only the first liquefied gas vaporizing section 61 will be described.

In this embodiment, the first liquefied gas vaporizing section 61 has nine liquefied gas tubes 21, and ten heat transfer tubes 4 are connected to each liquefied gas tube 21. The hot water supply tube 25 and the hot water discharge tube 33 connected to an end of each liquefied gas tube 21 are connected to a hot water supply manifold 63 and a hot water discharge manifold 64, respectively. The other end of each liquefied gas tube 21 is connected to the liquefied gas supply source 50 via the liquefied gas supply manifold 26 and a duct 51. In this embodiment, the liquefied gas supply source 50 is a liquefied propane gas (LPG) source.

In this embodiment, each liquefied gas tube 21 is an aluminum tube having an outside diameter of 6 cm, a thickness of 2.5 mm and a length of about 200 cm, and four hot water tubes 22 are arranged therein. For the hot water tube 22, the outer tube 23 is a stainless steel tube having an outside diameter of 1.8 cm, a thickness of 1.5 mm, and a length of about 195 cm, and the inner tube 24 is a stainless steel tube having an outside diameter of 1.0 cm, a thickness of 1.0 mm and a length of about 210 cm. In this embodiment, liquefied propane gas (LPG) is supplied at a rate of about 26 L/minute to each liquefied gas tube 21. Hot water temperature is controlled within a range of from 20° C. to 80° C., and supplied at a rate of 100 L/minute to the inner tube 24 of each hot water tube 22.

Upon four-hour continuous operation under conditions including an atmospheric temperature of at least –8° C., a cloudy weather with no wind as in, i.e. summer season, hot water is never circulated into the hot water tube 22 in the liquefied gas vaporizing unit 60, i.e., in the air-heated/hot-water type vaporizer. The air-heated/hot-water type vaporizer therefore serves simply as an air-heated type vaporizer. That is, the liquefied propane gas (LPG) supplied to the air-heated/hot-water type vaporizer flows from the supply side manifold 2, i.e., from the liquefied gas tube 21 to the discharge side manifold 3 through the heat transfer tube 4. At this point, the liquefied propane gas is vaporized into propane gas (G) under the effect of the heat transfer tube 4 and the heat transfer fin 4A.

On the other hand, when using during the coldest season or in a cold district where the atmospheric temperature is lower than –8° C., hot water having a prescribed temperature is supplied from the hot water boiler 41 of the hot water supply source 40 into the hot water tube 22 of the supply-side manifold 2 through the supply duct L1.

The liquefied propane gas (LPG) is sent into the supply-side manifold 2, i.e., the liquefied gas tube 21, and in the supply-side manifold 2, exchanges heat with the hot water flowing through the hot water tube 22 having a reflux type double-pipe structure, whereby it is vaporized. The vaporized propane gas (G) flows to the discharge-side manifold 3 through the heat transfer tube 4. In general, therefore, while the liquefied propane gas is never vaporized in the supply-side manifold 2, the liquefied propane gas not vaporized in the supply-side manifold 2 is completely vaporized in the heat-transfer tube 4.

The propane gas (G) vaporized as described above is usually at a low temperature within a range of from –5° C. to –10° C. and sent from discharge-side manifold 3 to the heating section 70 through the ducts 65, 66, 67, 68 and 69. The heating section 70 comprises a usual air-heated type vaporizer, and heats the propane gas to an atmospheric temperature. Propane gas brought to the atmospheric temperature is mixed with air by, for example, a method disclosed in Japanese Application Laid-Open No. 61-180099, and after calorific adjustment, supplied to consumers such as general households through an underground duct (not shown).

Embodiment 3

In the above description, hot water heating of the supply-side manifold 2 has been described on the assumption of a case of using the same during the coldest season or in a cold district where the atmospheric temperature is lower than –8° C. In summer, for example, when frosting occurs on the heat transfer tubes 4 or the heat transfer fins 4A, hot water heating can be carried out, and frost can be automatically removed as a result, thus permitting avoidance of the necessity to use a spare vaporizer for switching for defrosting.

Also the above description has covered a case of a 13A propane-air gas producing plant using liquefied propane gas as raw material liquefied gas in a configuration comprising the air-heated/hot-water type vaporizer 1 of the invention as a liquefied gas vaporizing unit 60. The air-heated/hot-water type vaporizer 1 of the invention is suitably applicable also to a case using other LPG, for example, liquefied butane as raw material liquefied gas.

More specifically, liquefied butane used in the butane-air gas plant has a high boiling point: about 15° C. in a case with 1 $kg/cm^2 \cdot G$. It has therefore been impossible to use the conventional air-heated type forced vaporizer. The air-heated/hot-water type vaporizer 1 of the invention is in contrast suitably applicable, and it is now possible to very efficiently vaporize liquefied butane.

Further, the air-heated/hot-water type vaporizer 1 of the invention has a very high thermal efficiency a few times, i.e., two to three times as high as that of the conventional air-heated/hot-water type vaporizer because it has a hot water tube 22 of a reflux type double-pipe structure, thus permitting suitable use for vaporizing liquefied natural gas (LPG). As required, therefore, it is so convenient that the 13A propane-air gas producing plant described above is applicable with no modification. However, liquefied natural gas has a low evaporation temperature as –162° C. as compared with that of liquefied propane gas (LPG) of from –25° C. to –30° C. When achieving a gas producing plant using liquefied natural gas (LPG) as a liquefied gas source, therefore, it is necessary to increase the number of heat transfer tubes in the vaporizing section and the quantity of supplied hot water in the aforementioned 13A propane-air gas producing plant, and further, to add a heating section.

Embodiment 4

The 13A propane-air gas producing plant as described in Embodiment 2 can extremely efficiently produce 13A propane-air gas by using liquefied propane gas as raw material. However, when conducting continuous operation at a temperature of less than 0° C. the vaporized gas temperature is less than 0° C., and sometimes, it is required to solve the problems caused by the freezing of control valves and vapor mixer parts.

Figure 8:
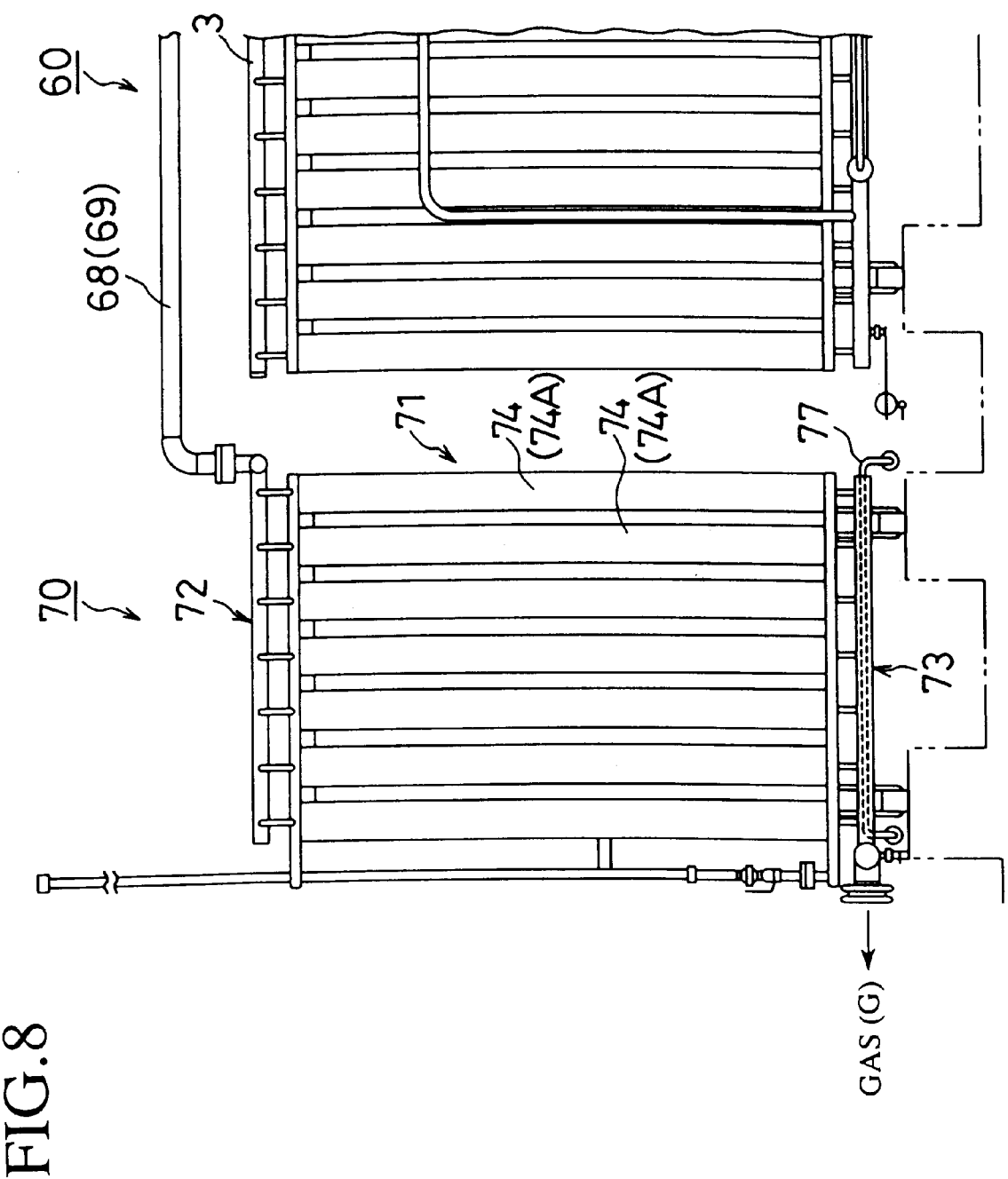
FIG. 8 is a front view of another embodiment of the heating section in the air-heated/hot-water type gas producing plant of the invention.
Figure 9:
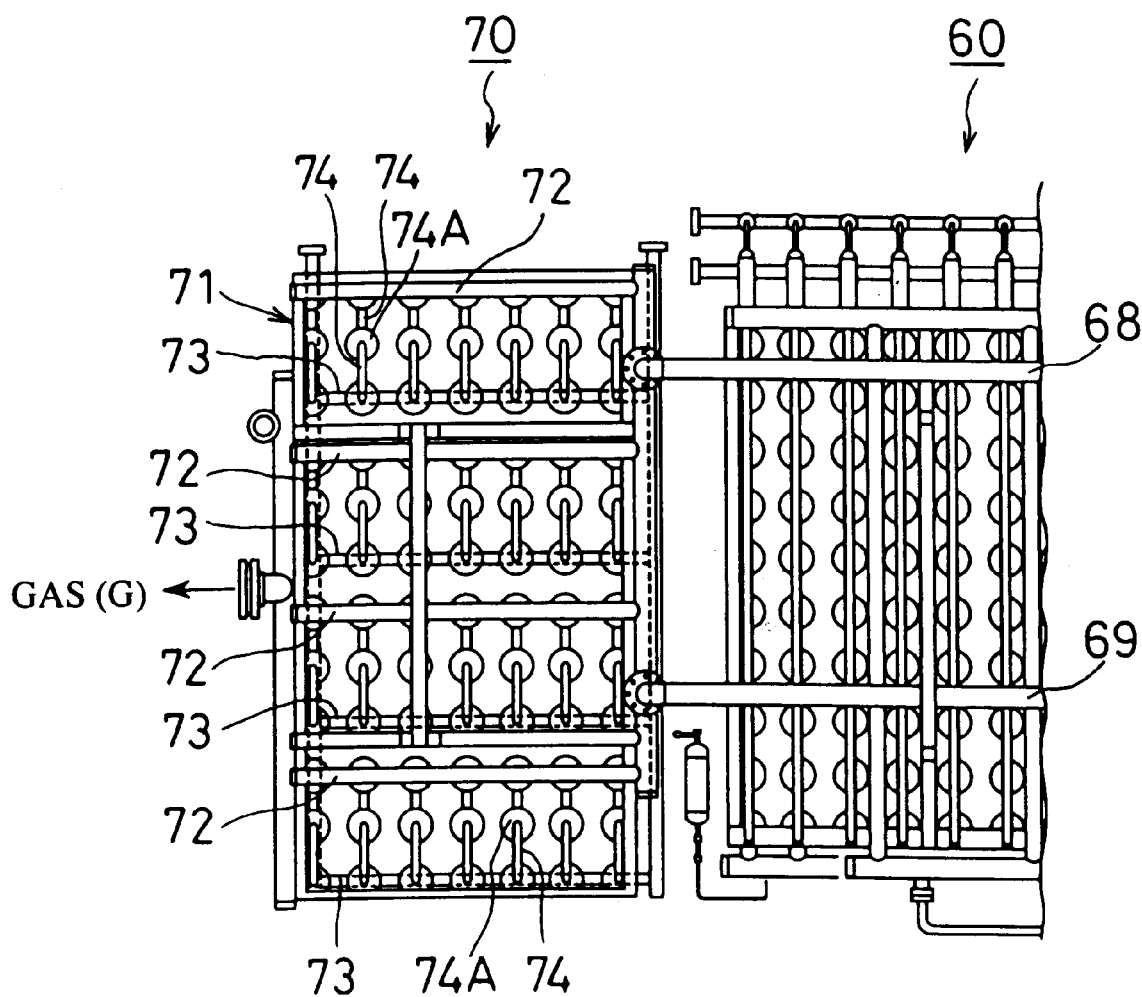
FIG. 9 is a plan view of the air-heated/hot-water type gas producing plant of the invention as shown in FIG. 8.
Figure 10:
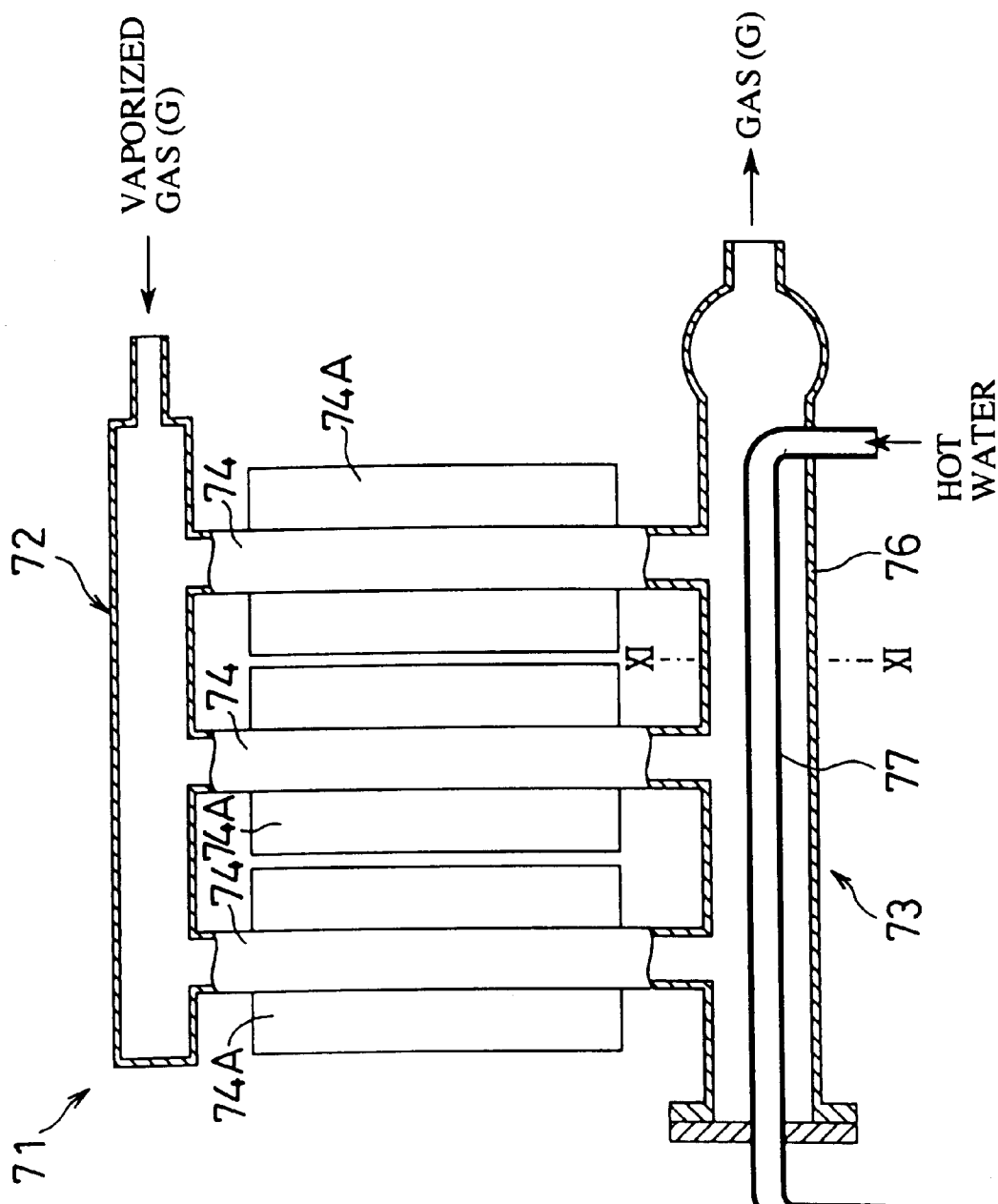
FIG. 10 illustrates a schematic configuration of the air-heated vaporizer using the heating section as shown FIG. 8.

According to the present embodiment, therefore, the air-heated vaporizer comprising the heating section 70 is further provided with a heating means. FIGS. 8 and 9 illustrate the heating section 70. FIG. 10 shows an embodiment of the air-heated vaporizer 71 with the heating means.

In this embodiment, the air-heated vaporizer 71 has a supply-side manifold 72 which is positioned at the upper portion of the vaporizer 71 and receives the vaporized gas from the vaporizing section 60, and a discharge-side manifold 73 which is positioned at the lower portion of the vaporizer 71 and receives the vaporized gas and supplies the gas to a vapor mixer (not shown). A plurality of heat transfer tubes 74 are connected between the supply-side manifold 72 and the discharge-side manifold 73. Further, to improve the heat transfer (endothermic) effect of the heat transfer tubes 74, heat transfer fins 74A are arranged around the heat transfer tubes 74. In FIG. 10, the heat transfer tube 74 is a direct tube but is not limited to this. The tube 74 may be a curved tube which reciprocates between the supply-side manifold 72 and the discharge-side manifold 73. Namely, as shown in FIG. 8 the heat transfer tube 74 extends downwards from the supply-side manifold 72, turns upwards without being connected to the discharge-side manifold 73, and then turns downwards to be connected to the discharge-side manifold 73.

In this embodiment, the discharge-side manifold 73 has a configuration having the heating means. Namely, the discharge-side manifold 73 has a vaporized gas tube 76 communicating with the individual heat transfer tube 74, to which vaporized and a hot water tube 77 having a double-pipe structure, arranged in the inside of the vaporized gas tube 76. As required, one or plural hot water tubes 77 may be arranged in the vaporized gas tube 76. In this embodiment, one hot water tube 77 is arranged as shown in FIG. 10.

Figure 11:
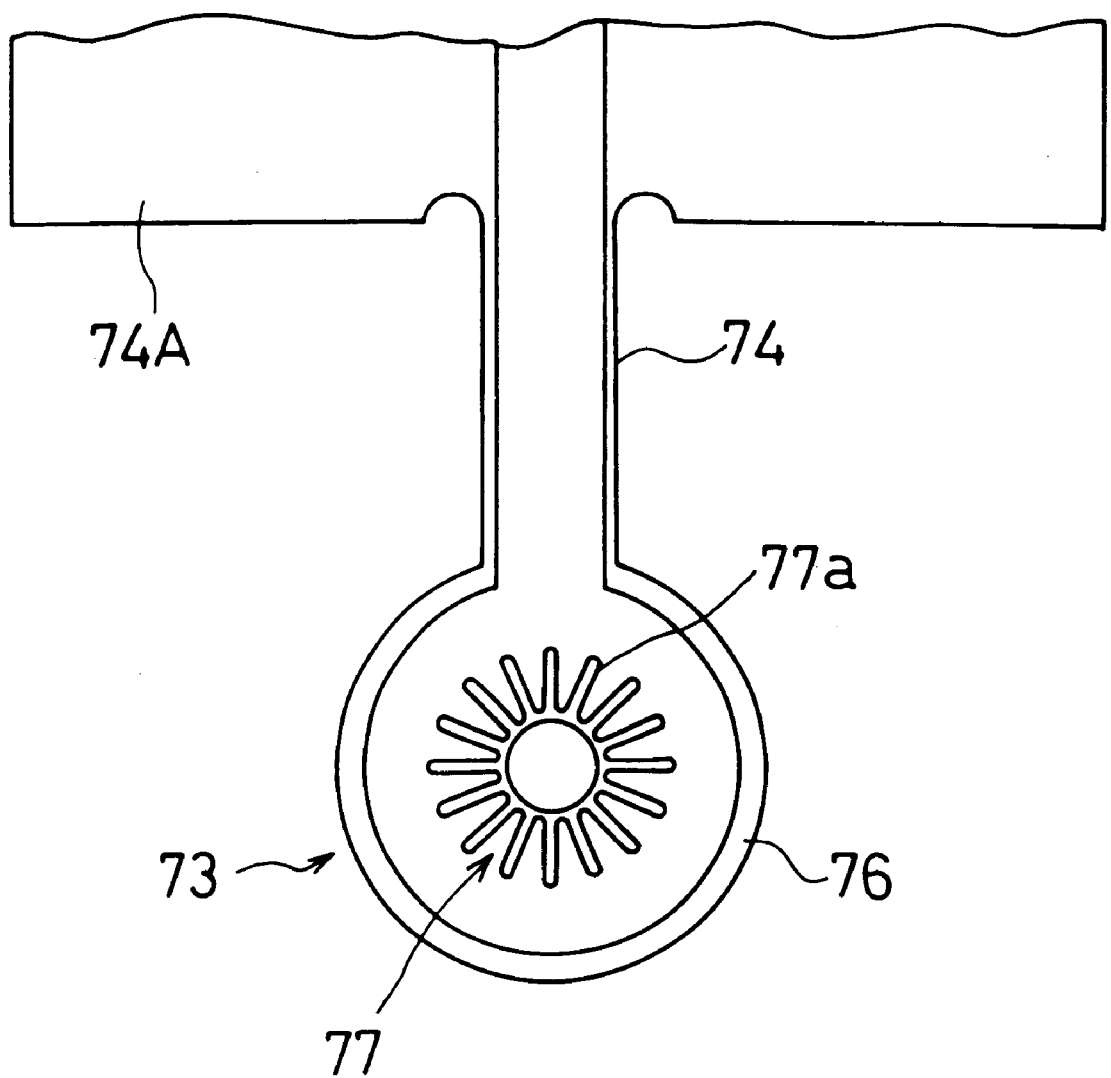
FIG. 11 is a sectional view taken along the line XI—XI in FIG. 10 for explaining another embodiment of the hot tube liquefied gas tube.

The hot water tube 77, as shown in FIG. 11, may use a finned hot water tube with a plurality of fins 77a which project in the radial direction and extend in the axial direction of the tube, and which are arranged on the circumference of the tube. The use of the hot tube 77 having such a construction can obtain good results.

The hot water tube 77 exchanges heat with the vaporized gas supplied to the discharge-side manifold 73 by the hot water which is supplied to one end of the hot water tube 77 and is discharged from the other end thereof, so as to heat the vaporized gas. This increases the vaporized gas (G) as discharged from the discharge-side manifold 73 to a temperature of more than 0° C.

Similar to the air-heated/hot-water type vaporizer 1 as described in Embodiment 1, water, water-antifreezing solution mixture, and other heat transfer mediums such as alternate fron (fluorocarbon) may be used as the hot water.

Embodiment 5

Figure 12:
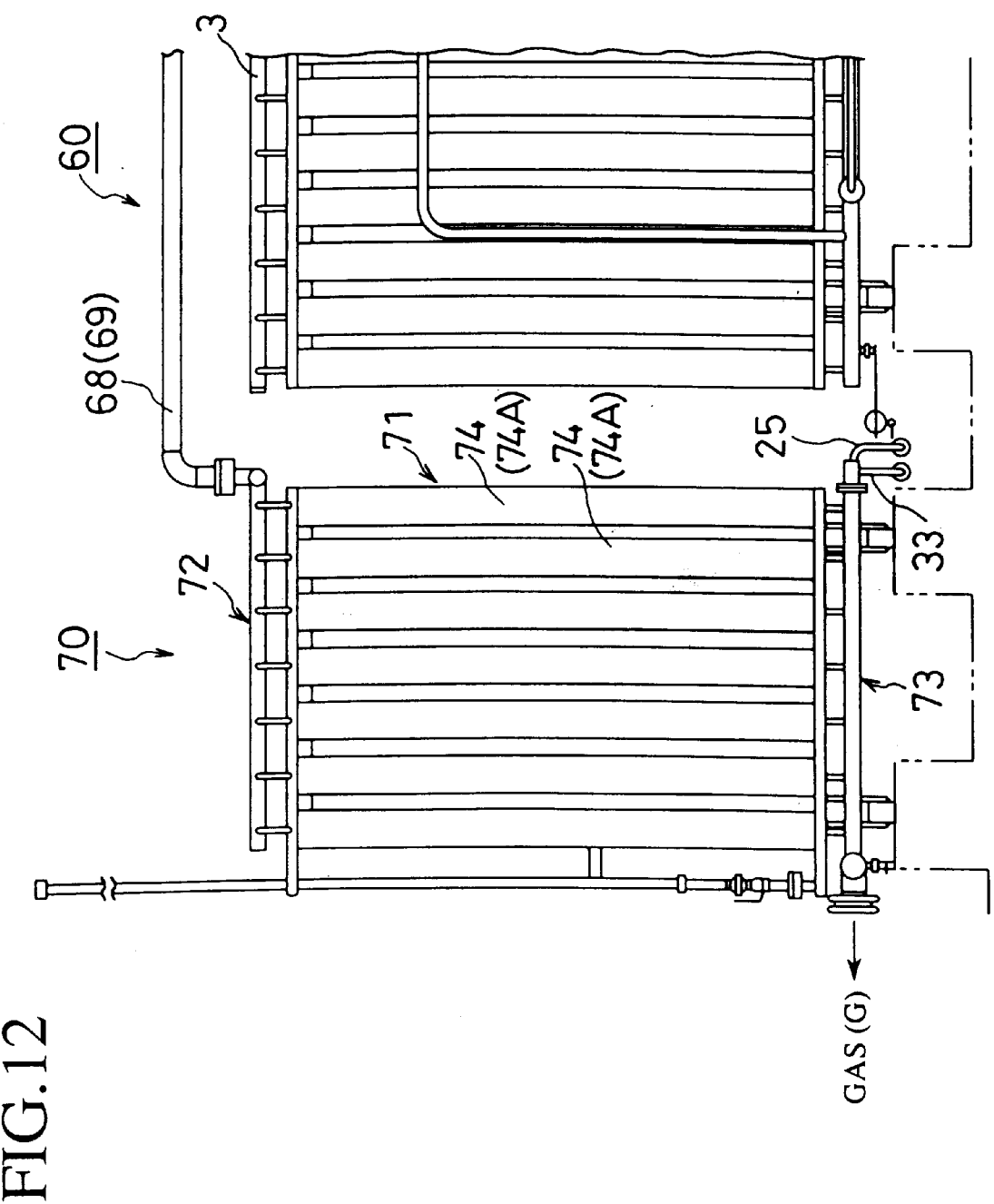
FIG. 12 is a front view of another embodiment of the heating section in the air-heated/hot-water type gas producing plant of the invention.
Figure 13:
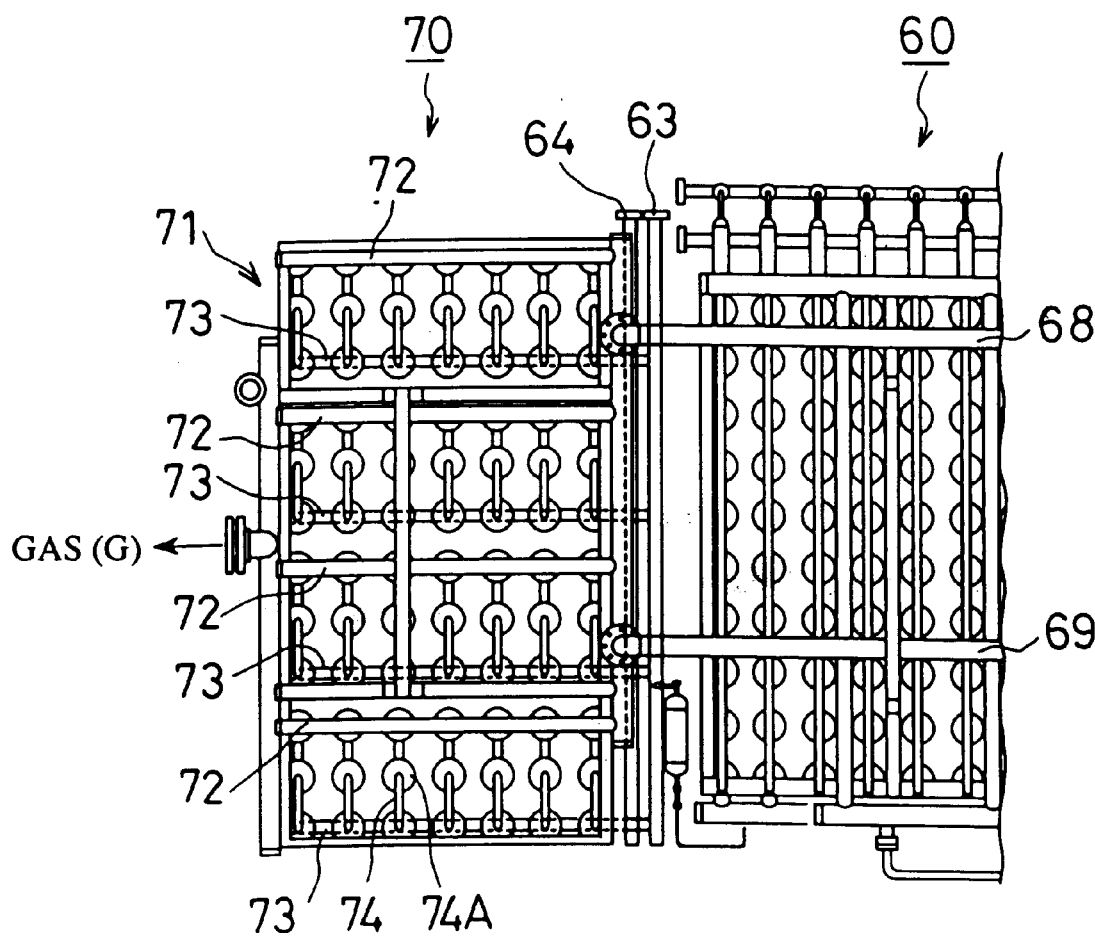
FIG. 13 is a plan view of the air-heated/hot-water type gas producing plant of the invention as shown in FIG. 12.
Figure 14:
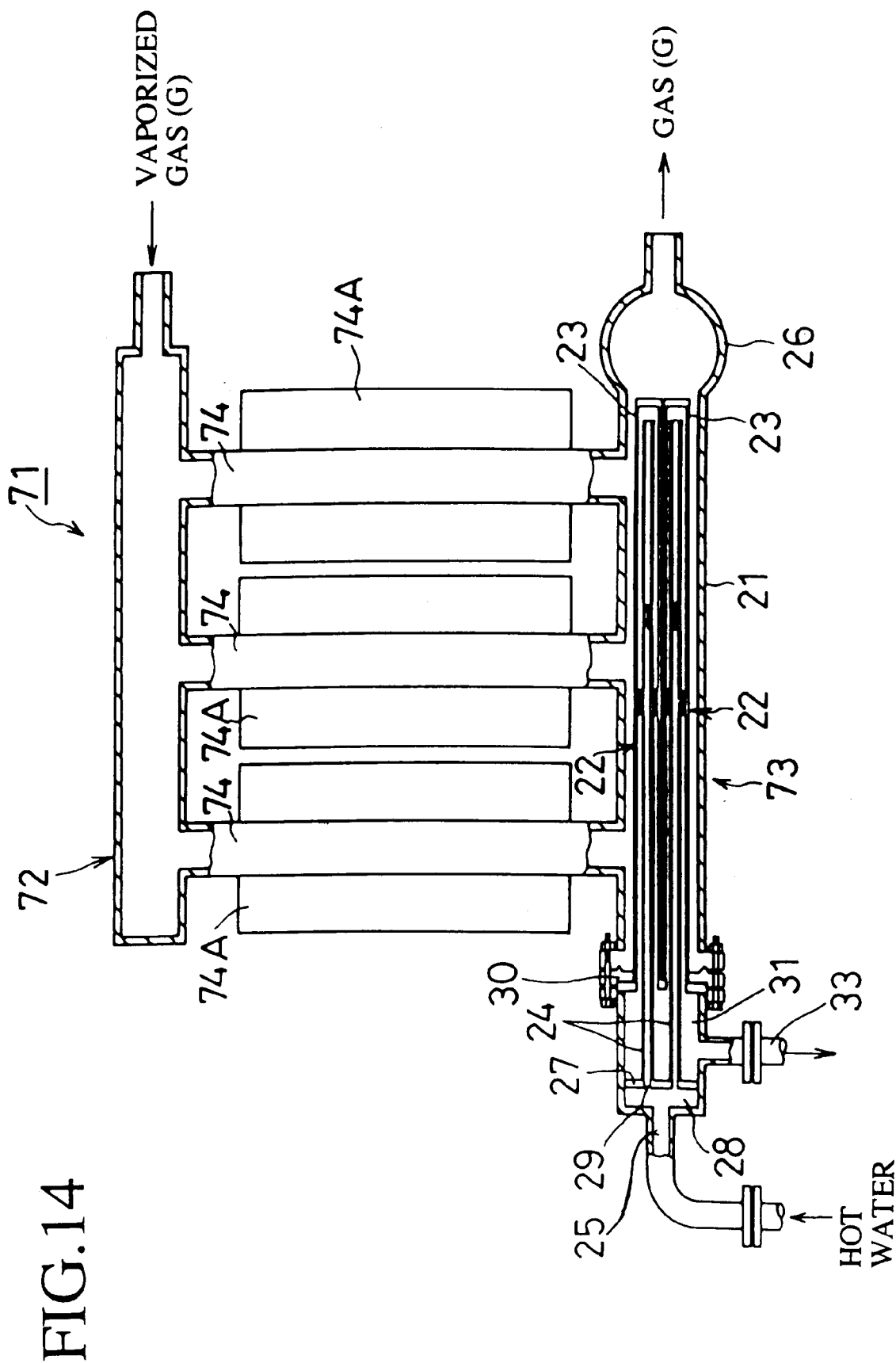
FIG. 14 illustrates a schematic configuration of the air-heated vaporizer using the heating section as shown FIG. 12.

FIGS. 12 to 14, similar to Embodiment 1, illustrate another embodiment of the air-heated vaporizer 71 provided with the heating section 70 and the heating means, which can be used in the present invention.

In this embodiment, the air-heated vaporizer 71 has the same configuration as the air-heated vaporizer as described in the above-mentioned Embodiment 4, and is merely different from the embodiment in the construction of the discharge-side manifold 73.

The discharge-side manifold 73 has the same construction as that of the supply-side manifold 2 of the air-heated/hot-water type vaporizer as described in Embodiment 1. Therefore, the parts having the same constructions and functions as those of the supply-side manifold 2 of the air-heated/hot-water type vaporizer 1 are assigned the same reference numerals, and a detailed description of the manifold will be omitted.

Namely, the discharge-side manifold 73 in this embodiment has a vaporized gas tube 21 communicating with the individual heat transfer tube 74 (liquefied gas tube 21 in Embodiment 1 is referred to as "vaporized gas tube", since the air-heated vaporizer 71 in this embodiment is supplied with vaporized gas in place of liquefied gas), and a hot water tube 22 having a double-pipe structure, arranged in the inside of the vaporized gas tube 21.

The constructions and functions of the vaporized gas tube 21 and the hot water tube 22 are the same as those described in Embodiment 1. In this embodiment, the hot water supplied to the hot water tube 22 exchanges heat with the vaporized gas supplied from the supply-side manifold 72 to the discharge-side manifold 73 to heat the vaporized gas. This increases the vaporized gas as discharged from the discharge-side manifold 73 to a temperature of more than 0° C.

Similar to the air-heated/hot-water type vaporizer 1 as described in Embodiment 1, water, water-antifreezing solution mixture, and other heat transfer mediums such as alternate fron (fluorocarbon) may be used as the hot water.

As described above, in the air-heated/hot-water type vaporizer and the air-heated/hot-water type gas producing plant of the present invention the air-heated/hot-water type vaporizer comprises a supply-side manifold, a discharge-side manifold, and a plurality of heat transfer tubes having ends on one side connected to the supply-side manifold and ends on the other side connected to the discharge-side manifold; the supply-side manifold to which the ends on one side of the heat transfer tubes are connected having a liquefied gas tube for supplying a liquefied gas and at least one double-pipe structured hot water tube for supplying hot water, arranged in the liquefied gas tube; the hot water tube having an inner tube having an end connected to a hot water source and the other opening end, and an outer tube having an opening end through which the inner tube is inserted inward and the other closed outer tube; hot water supplied from the hot water source to the inner tube flowing in the inner tube, and flowing out from the other end thereof to the closed end side of the outer tube; hot water having flowed out to the closed end side of the outer tube flowing through an annular path formed by the inner tube and the outer tube in a direction counter to that of hot water flowing in the inner tube, and discharged from the opening of the outer tube to outside; and liquefied gas supplied to the liquefied gas tube flowing outside the outer tube and being heated by hot water flowing through the hot water tube and vaporized. There are as a result available the following advantages:

(1) It is operable at a highest atmospheric temperature of 40° C. and a lowest atmospheric temperature of −30° C., permits stable use of a boiler, has a very high thermal efficiency, solves problems of the air-steam heating vaporizer, eliminates the necessity of maintenance control or water control for the boiler, and makes it possible to reduce the running cost.

(2) It is possible to improve the vaporizer capacity and the vaporizing capacity over those of the improved conventional air-heated/hot-water type vaporizer, with a very high thermal efficiency, and easier handling for a long period of time.

(3) It is operable by switching over between, for example, air heating in summer and hot water heating in winter in general, depending upon weather conditions and the like, and liquefied petroleum gas (LPG) and liquefied natural gas (LNG) can be vaporized at a further higher efficiency even in a cold district or during the coldest season.

What is claimed is:

1. An air-heated/hot-water type vaporizer comprising:
 a supply-side manifold, a discharge-side manifold, and a plurality of heat transfer tubes having ends on one side connected to said supply-side manifold and ends on the other side connected to said discharge-side manifold;
 said supply-side manifold having a liquefied gas tube to which the ends on one side of said heat transfer tubes are connected and which is supplied with liquefied gas, and at least one hot water tube with a double-pipe structure, which is arranged in said liquefied gas tube and which is supplied with hot water;

said hot water tube having an inner tube having an end connected to a hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside; and said liquefied gas supplied to said liquefied gas tube flowing outside said outer tube and being heated by the hot water flowing through said hot water tube and vaporized.

2. An air-heated/hot-water type vaporizer according to claim 1, wherein said liquefied gas is liquefied propane gas, liquefied butane gas, or liquefied natural gas.

3. An air-heated/hot-water type vaporizer according to claim 1, wherein said hot water has a temperature within a range of from about 20° C. to about 80° C.

4. An air-heated/hot-water type vaporizer according to claim 1, wherein said hot water is water, water-antifreezing solution mixture in which water is mixed with an antifreezing solution, or other heat transfer mediums.

5. An air-heated/hot-water type vaporizer according to claim 4, wherein said other heat transfer mediums include an alternate fluorocarbon.

6. An air-heated/hot-water type vaporizer according to claim 1, wherein:

a flat plate is attached to a position in the proximity to the end on the hot water supply side of said liquefied gas tube, thus delimiting a hot water supply chamber between the end of said liquefied gas tube and said flat plate;

an opening is formed in said flat plate, to which an end of said inner tube of the hot water tube is liquid-tightly attached;

a flange is attached to a position spaced apart of said flat plate toward the inside of said liquefied gas tube by a prescribed distance in said liquefied gas tube, thereby delimiting a hot water discharge chamber between said flat plate and said flange; and an opening is formed in said flange, to which the opening end of the outer tube of said hot water tube is liquid-tightly attached.

7. An air-heated/hot-water type vaporizer according to claim 6, wherein said liquefied gas tube is formed with a first portion provided with said flat plate and a second portion to which said heat transfer tube is attached, and said first portion and said second portion are connected by putting said flange, to which said outer tube is attached, therebetween.

8. An air-heated/hot-water type gas producing plant comprising a hot water supply source, a liquefied gas supply source, a liquefied gas vaporizing section for vaporizing liquefied gas supplied from said liquefied gas supply source by the hot water supplied from said hot water supply source, a heating section for heating the gas vaporized at said liquefied gas vaporizing section to a predetermined temperature; wherein said liquefied gas vaporizing section comprises an air-heated/hot-water type vaporizer, and said air-heated/hot-water type vaporizer has:

a supply-side manifold, a discharge-side manifold, and a plurality of heat transfer tubes having ends on one side connected to said supply-side manifold and ends on the other side connected to said discharge-side manifold;

said supply-side manifold having a liquefied gas tube to which the ends on one side of said heat transfer tubes are connected and which is supplied with liquefied gas, and at least one hot water tube with a double-pipe structure, which is arranged in said liquefied gas tube and which is supplied with hot water;

said hot water tube having an inner tube having an end connected to said hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside;

said liquefied gas supplied to said liquefied gas tube flowing outside said outer tube and being heated by the hot water flowing through said hot water tube and vaporized; and said vaporized gas being supplied to said heating section and heated.

9. An air-heated/hot-water type gas producing plant according to claim 8, wherein said liquefied gas is liquefied propane gas, liquefied butane gas, or liquefied natural gas.

10. An air-heated/hot-water type gas producing plant according to claim 8, wherein said hot water has a temperature within a range of from about 20° C. to about 80° C.

11. An air-heated/hot-water type gas producing plant according to claim 8, wherein said hot water is water, water-antifreezing solution mixture in which water is mixed with an antifreezing solution, or other heat transfer mediums.

12. An air-heated/hot-water type gas producing plant according to claim 11, wherein said other heat transfer mediums include an alternate fluorocarbon.

13. An air-heated/hot-water type gas producing plant according to claim 8, wherein said heating section has an air-heated vaporizer, and said air-heated vaporizer heats the vaporized gas.

14. An air-heated/hot-water type gas producing plant according to claim 13, wherein said air-heated vaporizer has a supply-side manifold which is arranged at an upper position of the vaporizer to receive the vaporized gas from the vaporizing section, a discharge-side manifold which is arranged at an lower position of the vaporizer to receive the vaporized gas and to supply the gas to a vapor mixer, and a plurality of heat transfer tubes connected to said supply-side manifold and said discharge-side manifold.

15. An air-heated/hot-water type gas producing plant according to claim 14, further comprising a heating means.

16. An air-heated/hot-water type gas producing plant according to claim 15, wherein said heating means has at least one hot water tube positioned in said discharge-side manifold.

17. An air-heated/hot-water type gas producing plant according to claim 16, wherein said hot water tube has a plurality of fins which project in a radial direction on the circumference of the tube and extend in an axial direction of the tube.

18. An air-heated/hot-water type gas producing plant according to claim 16, wherein:

said hot water tube has at least one hot water tube with a double-pipe structure, said hot water tube has an inner tube having an end connected to said hot water source and the other opening end, and an outer tube having an opening end through which said inner tube is inserted inward and the other closed end;

said hot water supplied from said hot water source to said inner tube flowing in said inner tube, and flowing out from the other end thereof to the closed end side of said outer tube, the hot water having flowed out to the closed end side of the outer tube flowing through an annular path formed by said inner tube and said outer tube in the direction counter to that of the hot water flowing in said inner tube, and discharged from the opening of said outer tube to the outside; and said vaporized gas supplied to said discharge-side manifold flowing outside said outer tube and being heated by the hot water flowing through said hot water tube.

19. An air-heated/hot-water type gas producing plant according to claim 16, wherein the hot water supplied to said hot water tube is water, water-antifreezing solution mixture in which water is mixed with an antifreezing solution, or other heat transfer mediums.

20. An air-heated/hot-water type gas producing plant according to claim 19, wherein said other heat transfer mediums includes an alternate fluorocarbon.

* * * * *